United States Patent [19]
Sheils

[11] Patent Number: 6,086,049
[45] Date of Patent: Jul. 11, 2000

[54] MECHANICAL ASSISTANCE MECHANISM FOR SHOVELS

[76] Inventor: Dennis Alan Sheils, 1655 Lincoln, Des Plaines, Ill. 60018

[21] Appl. No.: 09/360,572

[22] Filed: Jul. 26, 1999

[51] Int. Cl.[7] ..................................................... A01B 1/02
[52] U.S. Cl. ........................................ 254/131.5; 294/59
[58] Field of Search ............................... 294/49, 51, 53.5, 294/54.5, 57–60; 37/285; 254/131.5, 132

[56] References Cited

U.S. PATENT DOCUMENTS

| | | | |
|---|---|---|---|
| 568,962 | 10/1896 | Skeels | 254/131.5 |
| 803,142 | 10/1905 | Ward | 254/131.5 |
| 4,050,728 | 9/1977 | Davidson | 294/58 |
| 4,461,458 | 7/1984 | Poulin | 294/59 X |
| 4,881,332 | 11/1989 | Evertsen | 294/59 X |
| 5,054,830 | 10/1991 | Nisenbaum | 294/58 |
| 5,133,582 | 7/1992 | Rocha | 294/58 |

FOREIGN PATENT DOCUMENTS

| | | | |
|---|---|---|---|
| 1109731 | 2/1956 | France | 294/58 |
| 3141441 | 5/1983 | Germany | 294/59 |
| 2233539 | 1/1991 | United Kingdom | 294/59 |

*Primary Examiner*—Johnny D. Cherry
*Attorney, Agent, or Firm*—Charles F. Lind

[57] ABSTRACT

A shovel accessory for assistance in lifting and moving material in a shovel scoop includes an elongated, length adjustable, ground contacting support rod attached to the shovel handle. The rod is pivotable through half-circle arcs around an axis perpendicular to the handle length and rotatable in either direction completely around the handle shaft.

5 Claims, 3 Drawing Sheets

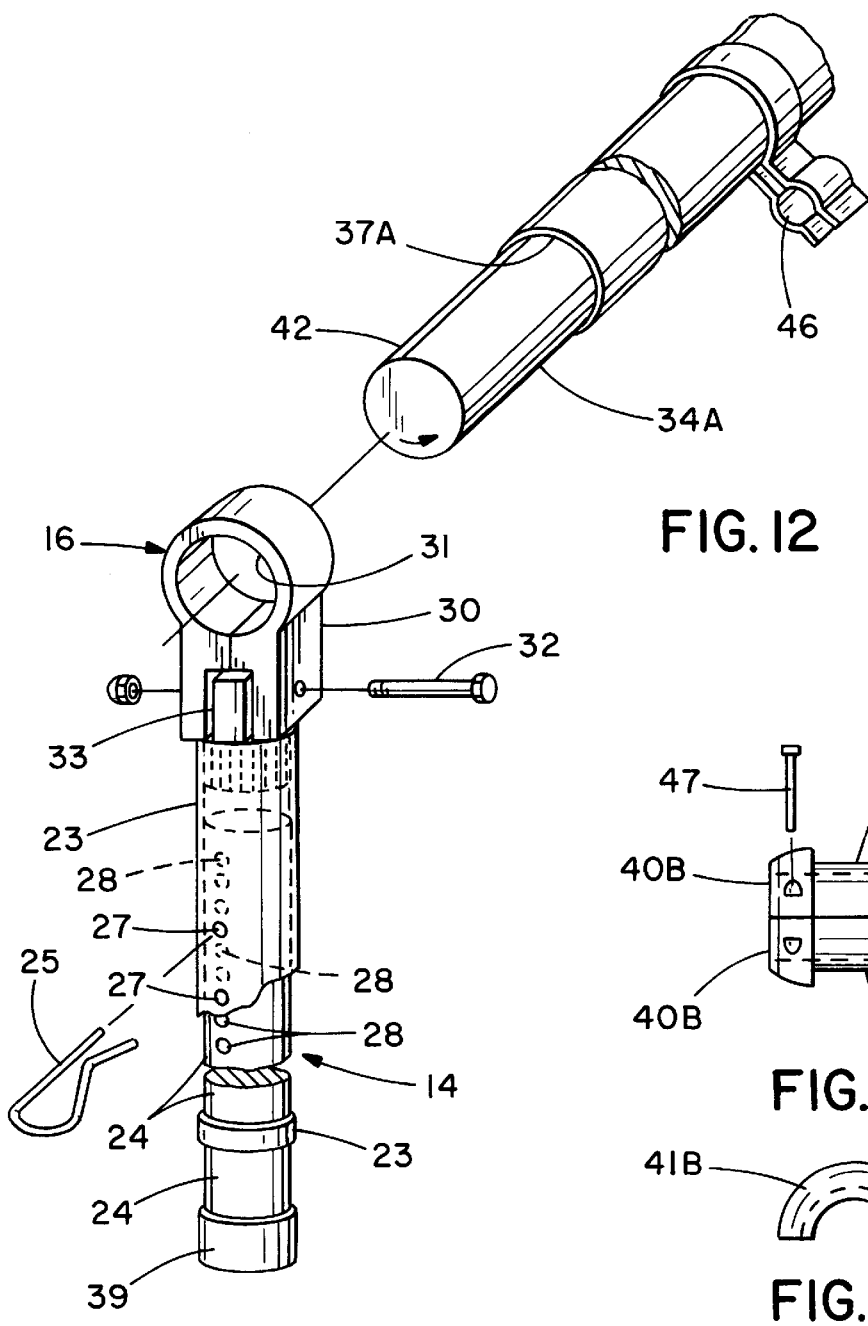
FIG. 12
FIG. 13B
FIG. 13A
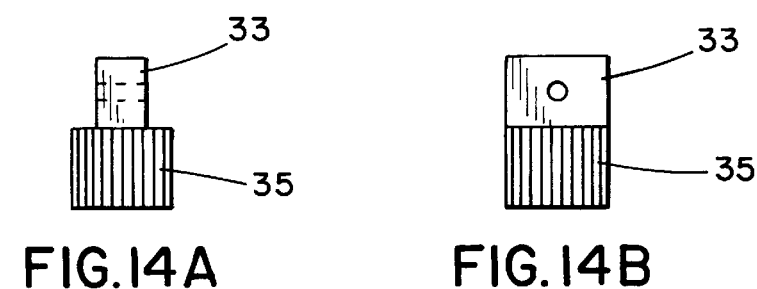
FIG. 14A    FIG. 14B

MECHANICAL ASSISTANCE MECHANISM FOR SHOVELS

BACKGROUND OF THE INVENTION

1. Field

The invention relates to mechanisms to be used with shovels for handling materials such as soil, sand and snow, and effective for providing mechanical assistance for reducing back stress and strain.

2. State of the Art

Spades, shovels and snow scoops have long been used for manipulating soil, sand or snow, and although effective, are notorious for imposing possible harmful strains on the user's spinal joints and/or back muscles. Such tools commonly have a load-carrying scoop located at the end of an elongated handle, where the handle is normally designed to be gripped by the user at spacings from the load and the loaded scoop is then laterally spaced from the user's feet. This means during use, the user's overall body typically will be curved or bent at the legs and waist to maintain a balanced or stable center of gravity. Lifting the loaded scoop vertically thus might strain and/or injure the user's back muscles and/or joints, particularly while the back in angled in a cantilevered manner and the loaded scoop is laterally spaced from the feet. Shovel use by those not in sound physical condition seemingly has even caused heart attacks due to the heavy effort and/or exertion of lifting the loaded shovel scoop. Thus, fatigue, soreness, and injury attendant with shovel use have been long-standing and well recognized problems.

U.S. Pat. Nos. 4,461,458 and 4,881,332 show modified shovel designs that include an elongated ground contacting support member pivoted to the shovel shaft near the lower hand gripping area, so that during shovel use both the shovel scoop and the free end of the support member could be rested against the ground. The user might then first lift the shovel handle upwardly to close the gap between the shovel scoop and grounded support member end, and might secondly then rock the shovel handle downwardly to drive the shovel scoop into and under the material to be shoveled, and then lastly might pull the handle rearwardly back to rotate the grounded support member while maintaining the shovel level, operable to lift the scoop and material thereon off of the ground.

However, while these devices offered improved shovel operation, neither allowed the achievement of several advantageous benefits available with the inventive mechanism as will be disclosed herein.

SUMMARY AND OBJECTS OF THE INVENTION

With the foregoing in mind, the invention provides a shovel accessory mechanism operable to minimize back stresses and strains frequently incurred when using conventional shovels.

A basic object of the invention is to provide a shovel accessory mechanism that offers mechanical assistance to the user in lifting and moving material contained in a shovel scoop, and in carrying or moving the load over short distances, and without bending one's back excessively or straining the back muscles when lifting the loaded shovel scoop.

Another object of the invention is to provide a shovel accessory mechanism that is of a simple and lightweight construction that can be easily and economically added to or built into a shovel operable to offer mechanical assistance to the user in lifting and moving material contained in a shovel scoop.

Specific features of the inventive mechanism include an elongated, ground contacting support member or power transfer rod that is attached at one end to the shovel shaft or handle, near the lower hand gripping area adjacent the shovel scoop, to allow rod pivoting throughout approximately half-circle arcs relative to the handle but only around axes substantially perpendicular to the handle length. The rod attachment connection further is formed to allow full and even repeated rod rotations around the handle. The power transfer rod is adjustable in length, operable then to allow the shovel to be set to specifically fit the size of the user, such as at least approximately to be at the same height above the ground as the height of the user's dangling hands when standing straight up with the back substantially straight. The adjusted rod lengths also allow the user to operate the shovel for different purposes, such as to clean material off of stairs, with the power transfer rod being supported on one step while the scoop is shovelling material from a different higher. step.

DRAWINGS AND FIGURES

These and other objects, features or advantages of the invention will be more fully understood and appreciated after consideration of the following description of the invention, which includes as a part thereof the accompanying drawings, wherein:

FIG. 12 is an exploded perspective view of components of the attachment connection used herein; and FIGS. 13A and 13B, and 14A and 14B are different views of components of the attachment connection used herein.

DETAILED DESCRIPTION OF PREFERRED EMBODIMENTS OF THE INVENTION

Preferred embodiments of mechanically assisted shovels will be disclosed herein, but for clarity and ease of disclosure, not all components or specific details of a component are illustrated in all figures, and conventional components may not be illustrated in precise details.

Figure 1:
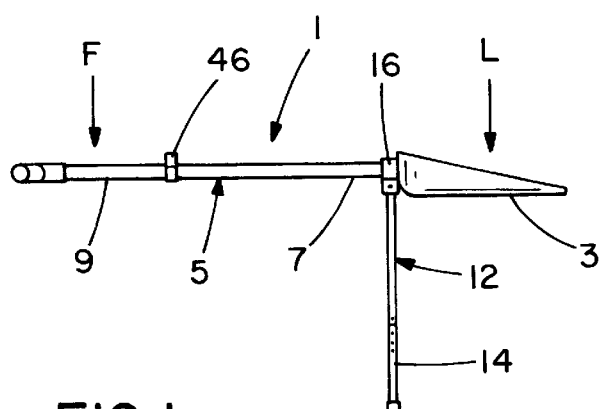
FIG. 1 is a side elevational view of a typical shovel having the subject mechanical assistance system incorporated thereon and showing the shovel in a fully lifted position of operation.
Figure 2:
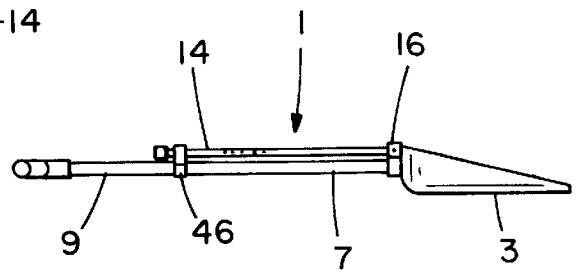
FIG. 2 is a side elevational view of the shovel of FIG. 1, except showing the mechanical assistance system shifted to a stored or inoperative position of the shovel.

In FIGS. 1 and 2, an improved shovel 1 is illustrated that might be formed by adding appropriate mechanisms onto most any conventional shovel. The illustrated shovel 1 has a conventional material handling scoop or head 3, and a handle or shaft 5 connected to the shovel head and projected along its longitudinal axis away from the head. During normal use, the conventional shovel might be gripped at two axially spaced areas along the handle shaft, with a lower grip area 7 being closely adjacent the shovel scoop and an upper grip area 9 being more axially remote from the scoop and spaced from the lower grip area 7 typically by up to several feet.

The disclosed mechanical attachment mechanism 12 is comprised of a power transfer rod 14 connected at one end via a bracket 16 to the shaft 5, axially near the lower grip area 7. The bracket 16 is mounted to rotate around the handle shaft, while being axially fixed relative to the shaft. The power transfer rod 14 is mounted to pivot relative to the bracket 16, about an axis extended perpendicular to but laterally offset from the axis of the handle shaft, for swinging through an approximate half-circle arc along a plane extended through the handle shaft. With this mechanism mounting, the bracket 16 and power transfer rod 14 can be rotated completely around the handle shaft, rotation after rotation, while the rod can be pivoted less than 180 degrees between opposite alignments against the handle shaft or shovel head, and an apex position typically disposed to lie substantially perpendicular to said handle shaft axis.

FIGS. 9–14 show more detailed views of the power transfer rod 14 and its connection via bracket 16 relative to the shovel handle shaft 5. The power transfer rod 14 is elongated and formed of telescoping members 23, 24 that can be shifted between minimum closed and maximum opened lengths, the members having axially spaced openings 27, 28 formed along each suited for having a locking pin 25 inserted through aligned sets of such openings for locking the members 23, 24 together at specific adjusted rod lengths.

The bracket 16 shown is formed as a U-shaped piece 30 with separate legs meeting at a closed end and defining a cylindrical opening 31 sufficiently large to fit onto and be freely rotated around the handle shaft, while being axially contained thereon as between spaced stops or shoulders 36A, 37A or 36B, 37B. The power transfer rod 14 is pivoted to the bracket 16 near the free ends of the legs, on shoulder bolt 32 extended through aligned openings in the bracket piece legs and in a tonaue 33 on a connector 35 swedged or otherwise fixed onto the upper end of the tubular telescoping member 23. The connector tongue 33 is thinner than the bracket end slot receiving it, so that the shoulder bolt 32 when tightened by the lock nut serves also to hold the bracket 16 rotatably secured on the handle shaft. The axis of the pivot bolt 32 is disposed laterally of the axis of the bracket opening 31, and these axes are substantially perpendicular to one another. A rubber foot 39 can be applied to the free end of the power transfer rod 24.

Figure 9:
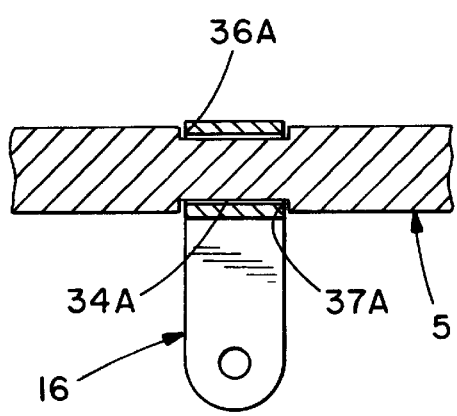
FIGS. 9 and 10 are sectional views of different embodiments of the attachment connections used between the mechanical assistance system disclosed herein and shovel.
Figure 10:
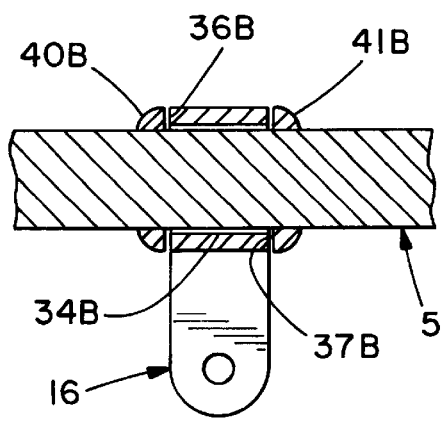

FIGS. 9 and 10 illustrate different embodiments of shoulder containment of the bracket 16: FIG. 9 having annular bearing area 34A smaller than the exterior diameter of the shovel shaft and sized to receive the bracket opening, with adjacent stops or shoulders 36A, 37A being formed on the handle shaft or related structure and having exterior diameters larger than the bracket opening 31; and FIG. 10 having the annular bearing area 34B sized the same as the handle shaft or any sleeve bearing that might be used for receiving the bracket opening 31, and adjacent shoulders 36B, 37B being made up of separate clamps or retainers 40B, 41B secured axially and nonrotatably relative to the shaft and being larger than the bracket opening 31.

The bracket piece 30 might be rigid whereby the opening 31 would have to be fitted over a free end 42 of the handle shaft during initial assembly of the shovel (somewhat as in FIG. 12) with the protruding shaft end further then being inserted into and secured within a cooperating socket 44 on the shovel head 3 by locking screws passed through openings in the head and threaded into the handle shaft. Alternatively, the bracket piece 30 might be sufficiently flexible to have its free leg ends flexed apart enough to be slipped laterally over the handle shaft 5, suited for having the assist mechanism 12 packaged as a kit for an in-the-field connection to an existing conventional shovel, without disassembling the shovel. The retainers 40B, 41B likewise might be comprised of two half sections (see FIGS. 13A, 13B) that are placed around the shovel handle shaft 5 and tightened together by screws 47 to become fixed relative to the shaft. For example, small barbs (not shown) might be formed on the inside of the half sections to protrude into a wooden handle shaft for providing this fixed association with the handle shaft.

A pair of half-piece journal sleeve bearings might also be used, positioned on the handle shaft 10 where needed adjacent the scoop and sized to fit properly in the bracket bearing opening 31 between the retainers, as illustrated in the FIGS. 13A, 13B.

A preferred minimum closed rod length would allow the power transfer rod to be shifted and aligned in a storage or non-use position laterally spaced but generally parallel side-by-side relation with the handle shaft (see FIG. 2), extended between the bracket 16 and a location short of the upper hand grip location 9. This can be achieved by rotating the bracket 16 and rod 14 pivoted thereto around the handle shaft 5 to the upper side of the handle shaft and then rotating the rod around the bracket to lie adjacent the handle shaft. A clip 46 held on the handle shaft 5 can receive and hold the power transfer rod 14 in this inoperative or storage position. Thus, the shovel of FIG. 2 in most instances, with the qrip areas 7 and 9 exposed and accessible, can be used in the same manner as,any conventional shovel not having the power transfer mechanism 12 thereon.

Figure 3:
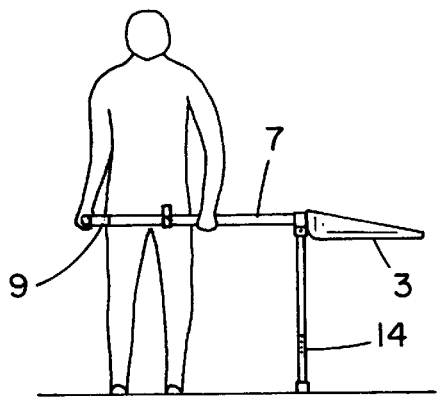
FIG. 3 is a side elevational view of the shovel of FIG. 1, further shown adjusted for a user who can then shift loads without lifting the shovel vertically with a curved or bent over back.
Figure 6:
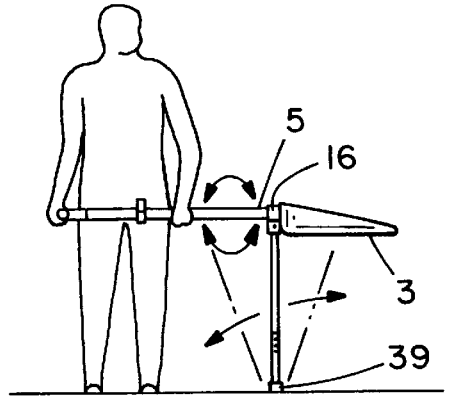

For shovel versatility in accommodating users of various heights and/or for achieving different functions, the maximum opened power transfer rod might be long enough when aligned vertically to support the shovel handle shaft 5 aligned approximately parallel to the ground, while the user holds the shovel substantially level with his/her back substantially straight and upright and arms straight (see FIGS. 1, 3, 6). If a user might not need this power transfer rod length and/or shovel height, the rod length can be changed with the locking pin 25 being shifted to any other combination of selected aligned pairs of openings 27, 28 in the telescoping members 23, 24, making the shovel user or job specific.

Figure 11:
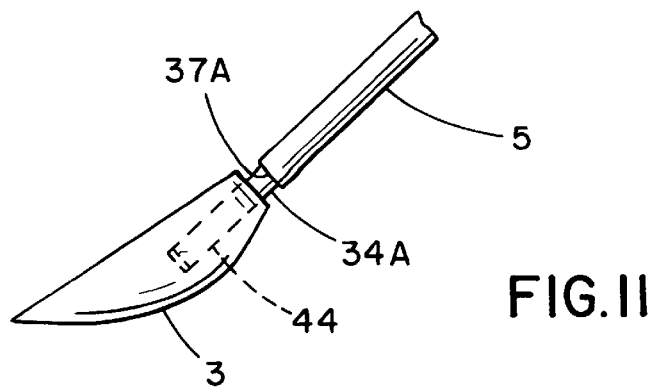
FIG. 11 is a side elevational view of the shovel having a FIG. 9 embodiment attachment connection, except showing it without the mechanical assistance system in place.

The annular bearing area 34A, without the bracket 16 and lift mechanism 12 in place, is illustrated in FIG. 11, between shoulder 37A formed on the shovel shaft 3 and shoulder 38B on the shovel head 3 adjacent the cooperating socket 44. The illustration can represent a shovel construction having a steel handle shaft with a plastic layer or overwrap on the shaft, where the shoulder 37A is formed at an edge of the plastic overwrap and the shovel handle shaft also serves as the journal bearing surface for the rotatable bracket 16. Other shovel forms can be modified to include the mechanism 12, such as with or for wood handle shafts, or molded plastic or stamped metal shovel scoops and associated cooperating sockets.

Figure 4:
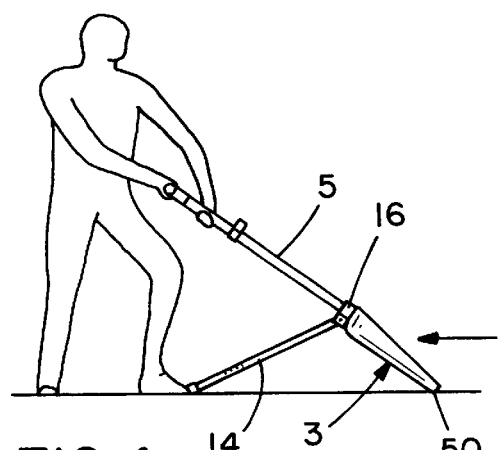
FIGS. 4, 5 and 6 are sequential side elevational views of a user holding the shovel of FIG. 1, showing the mechanical assistance system being used on level ground.
Figure 5:
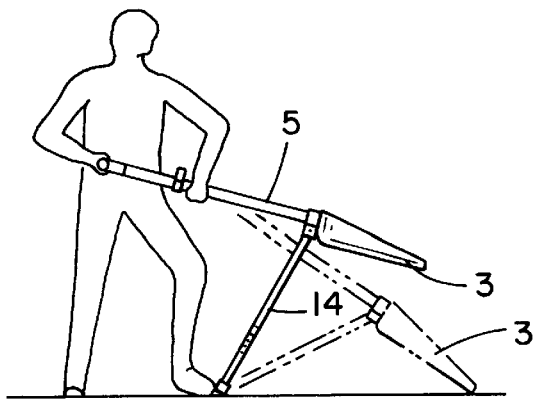

In using the shovel equipped with the mechanical assistance mechanism 12, the power transfer rod 14 must be released from storage clip 46, rotated to the underside of the handle, and adjusted to the needed length. The end edge 50 of the shovel scoop 3 is then rested on the ground or supporting surface next to the material to be moved, the end foot 39 of the power transfer rod is also rested on the ground, and the shovel handle is tilted upwardly away from the material to an angle of perhaps between 30–50 degrees above the supporting surface, causing the rod end to shift closer to the shovel end edge 50 and to an included angle between the transfer rod and shovel handle of approximately at a right angle or less. The user then places one foot against the free end of the power transfer rod (see FIG. 4) to brace the rod 24 end against the ground, and pushes the upper handle grip downwardly. This increases the gap between the shovel scoop end edge 50 and braced rod end, and forces the scoop into or under the material, increasing the included angle between the transfer rod and shovel handle to between possibly 110–140 degrees and lowering the shovel handle upper gripping area to possibly waist high and an orientation where the shovel scoop might be almost horizontal. The shovel handle shaft 5 is then pulled rearwardly (see FIG. 5) to rotate the power transfer rod 14 about the braced rod end to raise the loaded scoop off of the ground. When the power transfer rod reaches its apex position and/or lies along a vertical axis (see FIG. 6), the load in the shovel scoop 30a is supported above the ground by the power transfer rod and the user is only balancing the load.

From the apex position, the user can direct the loaded shovel scoop either the left or right by rotating the shovel handle shaft horizontally around the vertical power transfer rod and/or by leaning the power transfer rod 24 in the appropriate sideways direction as depicted in the figure. This might then position the loaded shovel scoop over a wheelbarrow or in the case of a snow shovel to the side of the sidewalk, etc. The user can further dump the load out of the shovel scoop by rotating the shovel handle shaft about its axis clockwise or counterclockwise by at least 90 degrees, so that the bottom of the shovel scoop lies in a vertical plane or even faces the supporting ground, whereby gravity will cause the load to slide off of or out of the scoop. In the apex position, the user's arms might typically be extended nearly straight down and his/her back might be substantially straight, whereupon the loaded shovel could optionally be lifted off of the power transfer rod support and be carried to a different location for dumping. However, as the load already has been elevated to be approximately hip-high, as the user's back is substantially straight and perpendicular to the ground, and as the loaded shovel is close to the user's body and center of gravity, the user will not have to lift the load with a bent over back and with the load significantly spaced laterally from his/her feet.

Figure 7:
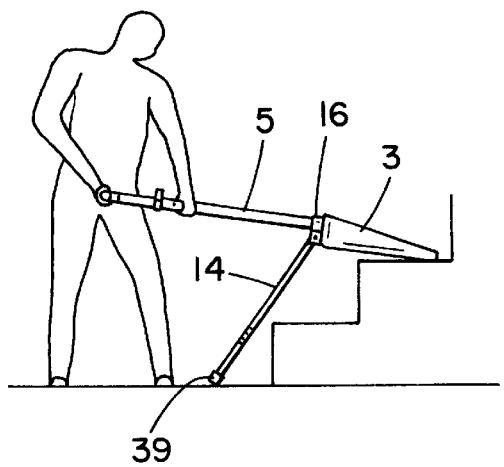
FIG. 7 is a side elevational view of a user holding the shovel of FIG. 1, showing the mechanical assistance system being used on stairs.
Figure 8:
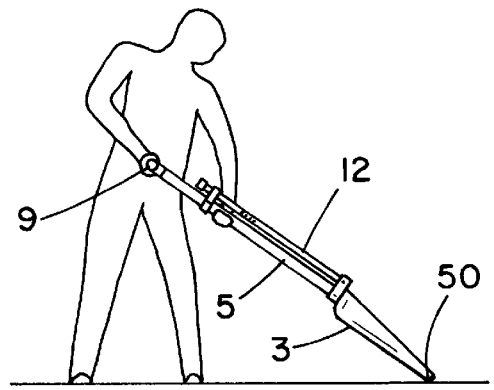
FIG. 8 is a side elevational view of a user holding the shovel of FIG. 2, for conventional shovel use modes.

The foot-braced free end of the power transfer rod typically will not slide along the ground as the user pulls back on the shovel handle (FIG. 5), and the loaded scoop will rise up and back along the arc of the transfer rod pivoting about its lower end braced against the ground. The height the load will be lifted to corresponds to the length of the power transfer rod. The power transfer rod-handle shaft mounting allows unlimited handle shaft rotation, in either direction, for effectively dumping the load even while and simultaneously of the loaded scoop being supported by the power transfer rod at the apex of its arc, transferring the load weight via the power transfer rod to the ground instead via the user's back. The adjustable power transfer rod length allows for different modes of shoveling, such as stairs (see FIG. 7), where the rod end 39 and scoop end edge 50 need not be on level or even the same supporting surface.

The mechanical assist leverage system, with the handle shaft fulcrum at the rotatable bracket 14 closely adjacent the load, creates a mechanical advantage due to the greater distance the shovel handle shaft and upper gripping area 9 is spaced from the fulcrum at the rotatable bracket 16, compared to the distance of the loaded shovel scoop from the fulcrum or rotatable bracket 14, such as three feet vs one foot, creating a power lift ratio of 3:1. Other ratios can be provided depending upon the relative distances between the shovel handle shaft gripping area 9, the loaded scoop and fulcrum or rotatable bracket 14. Moreover, the lifting forces normally applied to the handle by the hands are reversed, being downwardly and/or laterally for providing the upward lifting of the loaded scoop; and the user can manipulate the handle without bending his/her back for minimizing potentially harmful spinal and muscle stresses.

The scoop 3 can be changed in size and configuration; also the handle shaft 5 can be made in different diameters and lengths depending on the intended purpose of or shovel type in question. The handle shaft at the upper gripping area 9 can be straight as illustrated, can have a "D" shaped hand hole, or can be of any other conventional hand grip configuration. Most components of the assist mechanism are readily available commercially, or can be specially formed if needed by conventional methods including injection molding, metal stamping, die castings or the like, using common materials including steel, aluminum or its alloys, PVC or other plastics, etc., and/or lastly can be assembled as preassembled units or as kits for in-the-field assembly on conventional shovels. The present invention may be incorporated into different shovel configurations for achieving different specific tasks. When not required, the mechanism can be retained in an inoperative storage position, allowing normal shovel gripping and operations. The entire system will add approximately one-quarter of a pound or less to the weight of the shovel, and could allow shovel operation with increased ease and/or less frequent injuries or strains at reduced needed physical efforts, and increased productivity and profits due to reduced injury time offs.

While specific embodiments have been discussed and illustrated, minor changes could be made therefrom without departing from the spirit of the invention. Accordingly, the invention is to determined by the scope of the following claims.

What is claimed is:

1. In a shovel having a head defining a material handling scoop with a load carrying upper face, a handle shaft connected to the head and projecting axially away from the scoop, and two hand grip areas on the handle shaft including one grip area located closely adjacent the scoop and the other grip area located more axially remote from the scoop by a distance exceeding several feet, the combination therewith of a mechanical force-magnifying attachment comprising:

a bracket and means connecting the bracket to the handle shaft at a fixed axial location closely adjacent the one hand grip area for allowing unlimited bracket rotation in either direction completely around the handle shaft, and an elongated power transfer rod and means connecting the rod at one end to the bracket for rotating throughout at most about half-circle arcs defining planes extended through the handle shaft;

said power transfer rod thereby being adapted to be moved to operative positions underlying the handle shaft and to be angled transverse to the handle shaft to abut the opposite end of the rod against an underlying ground support, and also to be moved to an inoperative position disposed in adjacent side-by-side alignment with the handle shaft on its upper side, and means for releasably holding the rod in this inoperative position relative to the handle shaft with its opposite end adjacent the other grip area; and said power transfer rod being comprised of elongated members cooperating telescopically together operable to be shifted between minimum and maximum opened lengths, and means to lock the pair of elongated members at certain adjusted rod lengths.

2. A mechanical attachment for a shovel according to claim 1, further comprising said bracket connecting means comprising spaced shoulders integrally formed as part of the handle shaft on opposite sides of the bracket for axially restraining the bracket while allowing unlimited bracket rotation therebetween about the handle shaft.

3. A mechanical attachment for a shovel according to claim 1, further comprising said bracket connecting means having a retainer formed as two half sections operable to be placed around the handle shaft and tightened together to become fixed relative to the handle shaft, and spaced shoulders formed on the retainer for axially restraining the bracket while allowing unlimited bracket rotation therebetween about the handle shaft.

4. A mechanical attachment for a shovel according to claim 1, further comprising said bracket connecting means being formed as two half sections operable to be placed around the handle shaft and tightened together to define together a cylindrical axial bearing region surrounding the handle shaft, and the bracket cooperating with the bearing region for allowing said unlimited bracket rotation about the handle shaft.

5. A mechanical attachment for a shovel according to claim 4, further comprising shoulders upstanding from said half sections adjacent the defined cylindrical axial bearing region suited to engage the bracket and limit its axial movement along the handle shaft.

* * * * *